United States Patent
Konishi

(10) Patent No.: US 8,055,135 B2
(45) Date of Patent: Nov. 8, 2011

(54) DISPERSION COMPENSATOR, AND DISPERSION COMPENSATING METHOD

(75) Inventor: Tsuyoshi Konishi, Osaka (JP)

(73) Assignee: Osaka University, Osaka (JP)

( * ) Notice: Subject to any disclaimer, the term of this patent is extended or adjusted under 35 U.S.C. 154(b) by 493 days.

(21) Appl. No.: 12/308,879

(22) PCT Filed: Jun. 27, 2007

(86) PCT No.: PCT/JP2007/062932
§ 371 (c)(1),
(2), (4) Date: Feb. 5, 2009

(87) PCT Pub. No.: WO2008/001819
PCT Pub. Date: Jan. 3, 2008

(65) Prior Publication Data
US 2009/0196599 A1    Aug. 6, 2009

(30) Foreign Application Priority Data
Jun. 29, 2006   (JP) .................... 2006-180025

(51) Int. Cl.
*H04J 14/02*    (2006.01)
(52) U.S. Cl. .......................................... 398/81
(58) Field of Classification Search .......... 398/81
See application file for complete search history.

(56) References Cited

U.S. PATENT DOCUMENTS

| | | | |
|---|---|---|---|
| 6,097,862 A | 8/2000 | Abramov et al. | |
| 6,275,629 B1 | 8/2001 | Eggleton et al. | |
| 6,680,860 B1 * | 1/2004 | Merkel et al. | 365/119 |
| 7,646,982 B2 * | 1/2010 | Yamauchi et al. | 398/147 |
| 2003/0086136 A1 * | 5/2003 | Orr et al. | 359/23 |
| 2003/0151821 A1 * | 8/2003 | Favalora et al. | 359/619 |
| 2005/0238284 A1 * | 10/2005 | Takushima et al. | 385/24 |
| 2006/0279730 A1 * | 12/2006 | Konishi | 356/309 |
| 2007/0211982 A1 | 9/2007 | Tsuda | |
| 2007/0242955 A1 * | 10/2007 | Kavehrad | 398/130 |

FOREIGN PATENT DOCUMENTS

| | | |
|---|---|---|
| JP | 3-268373 | 11/1991 |
| JP | 2000-137197 | 5/2000 |
| JP | 2003-304201 | 10/2003 |
| JP | 2005-025103 | 1/2005 |
| JP | 2005-242214 | 9/2005 |
| JP | 2006-113185 | 4/2006 |
| JP | 2006-119427 | 5/2006 |
| WO | 2006/041191 | 4/2006 |

OTHER PUBLICATIONS

Hiroyuki Tsuda, Performance Analysis of a Dispersion Compensator Using Arrayed-Waveguide Gratings, Aug. 2000, Journal of Lightwave Technology vol. 18 No. 8, pp. 1139-1147.*

(Continued)

*Primary Examiner* — Kenneth N Vanderpuye
*Assistant Examiner* — Amritbir Sandhu
(74) *Attorney, Agent, or Firm* — Wenderoth, Lind & Ponack, L.L.P.

(57) ABSTRACT

A dispersion compensator (10) that compensates dispersion occurring in an optical pulse includes a spatial filter (100) from which a pulsed light having a single peak is emitted as an autocorrelation light when a light having a strong correlation with an optical pulse to be dispersion-compensated is introduced into the spatial filter, and from which a scattered light is emitted as a cross-correlation light when a light having a weak correlation with an optical pulse to be dispersion-compensated is introduced into the spatial filter, wherein the dispersion compensator compensates dispersion occurring in the optical pulse having the strong correlation with the optical pulse to be dispersion-compensated, with the autocorrelation light treated as a dispersion-compensated optical pulse.

12 Claims, 13 Drawing Sheets

OTHER PUBLICATIONS

International Search Report issued Aug. 21, 2007 in the International (PCT) Application of which the present application is the U.S. National Stage.

K. Tanimura et al., "Sensitive Detection of Transitional Spectral Pattern Using Optical Spectrogram Scope," Jpn. J. Appl. Phys., vol. 42, (Dec. 2003), pp. 7318-7325.

* cited by examiner

DISPERSION COMPENSATOR, AND DISPERSION COMPENSATING METHOD

TECHNICAL FIELD

The present invention relates to a dispersion compensator that compensates dispersion occurring in an optical pulse, and especially to a dispersion compensator that performs dispersion compensating processing for optical pulse by using correlation processing for optical pulse.

BACKGROUND ART

In recent years, with the advent of the advanced information society, optical communication networks in which optical fibers are used for transmission lines have been gradually developed. In the optical communication networks, using short optical pulses that can be superimposed enables a large volume of data to be transmitted at high speed. Further, the shorter a temporal length of an optical pulse becomes, the more it becomes possible to transmit the large volume of data at high speed.

It is to be noted that velocities of lights slightly differ from one another in a medium such as an optical fiber, depending on wavelengths, and wavelength dispersion, to be precise, group velocity dispersion occurs. That is to say, the shorter a temporal length of an optical pulse becomes, the more easily dispersion occurs in a wavelength, thereby restricting a transmission rate and a transmission distance to impede high-speed communication.

For this reason, in the optical communication networks where data are transmitted by controlling lights in a femtosecond time domain ($10^{-15}$ to $10^{-12}$ seconds), a dispersion compensator is imperative for compensating dispersion such as spread of or variation in a pulse width.

With this, for instance, dispersion compensators each using a chirped fiber grating (e.g., refer to Patent Reference 1) have been proposed.
Patent Reference 1: Japanese Unexamined Patent Application Publication No. 2000-137197

DISCLOSURE OF INVENTION

Problems that Invention is to Solve

However, in the case where a transmission line has been previously known, an optical pulse in which dispersion has occurring can be restored by performing inverse dispersion that cancels the dispersion. On the other hand, in the case where a transmission line is unknown, dispersion is compensated with an amount of dispersion being monitored. Accordingly, in an actual complex optical communication network in which optical pulses go through different transmission lines, each optical pulse obviously has a different amount of dispersion. It is totally impossible to separately compensate the optical pulses each arriving at very high repetition rate and high speed. In addition, although a dispersion compensator can to some extent respond to a change in a waveform of an optical pulse, there is a problem that the dispersion compensator requires an expensive high-frequency circuit or a special mechanism.

For example, since a grating pitch is locally varied by applying a predetermined temperature distribution in a longitudinal direction of a chirped fiber grating, a dispersion compensator using the chirped fiber grating requires a temperature adjusting element and a controller that controls the temperature adjusting element.

The present invention has been conceived in view of the above problems, and an objective of the present invention is to provide a dispersion compensator that compensates dispersion occurring in an optical pulse without requiring an expensive high-frequency circuit or a special mechanism.

Means to Solve the Problems

In order to achieve the above objective, a dispersion compensator according to the present invention is a dispersion compensator that compensates dispersion occurring in an optical pulse, and includes: a spatial filter from which a pulsed light having a single peak is emitted as an autocorrelation light when a light having a strong correlation with an optical pulse to be dispersion-compensated is introduced into the spatial filter, and from which a scattered light is emitted as a cross-correlation light when a light having a weak correlation with an optical pulse to be dispersion-compensated is introduced into said spatial filter, wherein the dispersion compensator compensates dispersion occurring in the optical pulse having the strong correlation with the optical pulse to be dispersion-compensated, with the autocorrelation light treated as a dispersion-compensated optical pulse.

Accordingly, the dispersion occurring in the optical pulse can be compensated only through optical correlation processing in which a spatial filter is used, without requiring an expensive high-frequency circuit or a special mechanism. Furthermore, dispersion compensating processing can be performed with a pulse still in light form, without converting light to electricity; therefore, a drop in throughput can be suppressed.

It is to be noted that the present invention may be realized not only as a dispersion compensator, but also as a dispersion compensating method used in the dispersion compensator for compensating dispersion occurring in an optical pulse. In addition, the present invention may be realized as a light source stabilizer that includes a spatial filter of the dispersion compensator, an optical communication apparatus that includes the dispersion compensator, and the like.

Disclosure of Invention

According to the present invention, dispersion occurring in an optical pulse is identified, and dispersion compensating processing for optical pulse can be performed by using recognition processing for optical pulse without performing inverse dispersion that cancels the identified dispersion. Accordingly, the dispersion occurring in the optical pulse can be compensated without requiring an expensive high-frequency circuit or a special mechanism.

Figure 1:
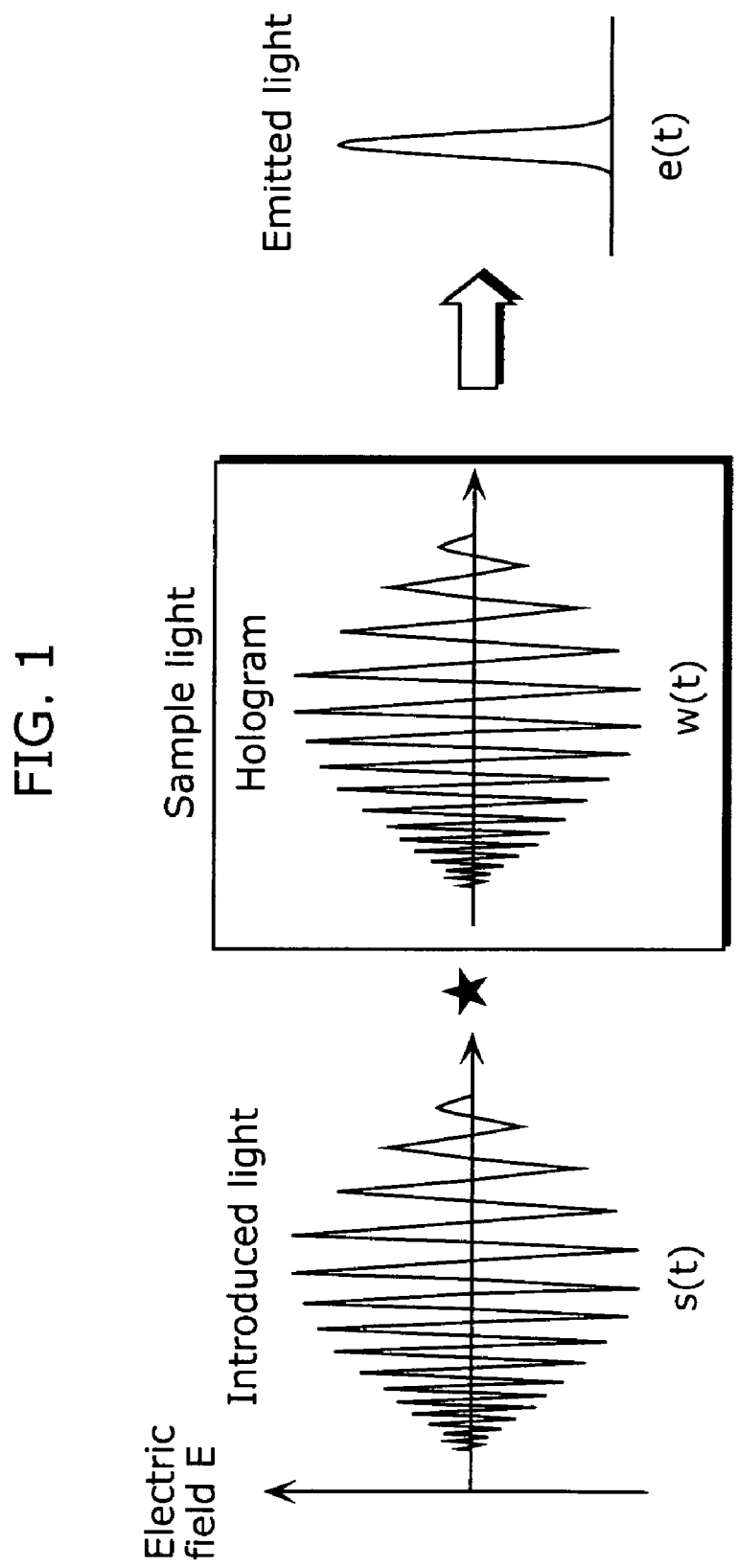
FIG. 1 is a diagram showing a fundamental principle of a dispersion compensating method in an embodiment 1 according to the present invention.

NUMERICAL REFERENCES 10, 20 Dispersion compensator
11 Diffraction grating
12 Collimator lens
13 Focus lens
14 Diffraction grating
30 Light source stabilizer
31 Light source
40 Optical communication node
100 Spatial filter
101 Optical filter
110 Hologram group
111 to 113 Hologram
131 to 133 Introduced light
141 to 143 Emitted light
200 Spatial filter
201, 202 Optical filter
210, 220 Phase distribution pattern group
211 to 213, 221 to 223 Phase distribution pattern

BEST MODE FOR CARRYING OUT THE INVENTION

Embodiment 1

The following will describe an embodiment 1 according to the present invention with reference to the drawings.

A dispersion compensator according to the present embodiment includes the following features (a) to (d).

(a) A dispersion compensator that compensates dispersion occurring in an optical pulse includes: (a1) a first diffraction grating that extracts a light having a specific wavelength from a light having mixed wavelengths; (a2) a collimator lens that converts the light having the specific wavelength extracted by the first diffraction grating into a parallel light beam; (a3) a spatial filter from which a pulsed light having a single peak is emitted as an autocorrelation light when for a light having a strong correlation with an optical pulse to be dispersion-compensated, and from which a scattered light is emitted as a cross-correlation light for a light having a weak correlation with an optical pulse to be dispersion-compensated, the light having the strong correlation and the light having the weak correlation being included in the lights passing through the collimator lens; (a4) a focus lens that focuses the light on which dispersion compensating processing has been performed in the spatial filter; and (a5) a second diffraction grating that restores the light focused by the focus lens to the light having the mixed wavelengths, (a6) wherein the dispersion compensator compensates dispersion occurring in the optical pulse having the strong correlation with the optical pulse to be dispersion-compensated, with the autocorrelation light treated as a dispersion-compensated optical pulse.

(b) The spatial filter includes holograms in each of which an amplitude and a phase of the optical pulse to be dispersion-compensated is recorded, from each of which the autocorrelation light is emitted when the light having the strong correlation with the optical pulse to be dispersion-compensated is introduced into a corresponding one of the holograms, and from each of which the cross-correlation light is emitted when the light having the weak correlation with the optical pulse to be dispersion-compensated is introduced into a corresponding one of the holograms.

(c) The spatial filter includes the holograms each of which corresponds to a corresponding one of the optical pulses to be dispersion-compensated, and each hologram is rectangular in shape and is arranged in array in a short side direction of the hologram.

(d) Each of the holograms has a computer-generated pattern calculated using an optimization algorithm, under a condition that a ratio of a correlation peak of an emitted light emitted from the hologram into which the light having the strong correlation with the optical pulse to be dispersion-compensated is introduced to a correlation peak of an emitted light emitted from the hologram into which the light having the weak correlation with the optical pulse to be dispersion-compensated is introduced increases.

In other words, when the light having the strong correlation with the optical pulse to be dispersion-compensated is introduced, the pulsed light having the single peak is emitted as the autocorrelation light, when the light having the weak correlation with the optical pulse to be dispersion-compensated is introduced, the light pulse is introduced into the spatial filter from which the scattered light is emitted as the cross-correlation light, and the dispersion occurring in the optical pulse having the strong correlation with the optical pulse to be dispersion-compensated is compensated, with the autocorrelation emitted from the spatial filter treated as a dispersion-compensated optical pulse.

In light of the above features, the dispersion compensator according to the present embodiment will be described.

First, a fundamental principle of a dispersion compensating method used in the dispersion compensator according to the present embodiment will be described.

When compensating dispersion of an optical pulse (hereafter, referred to as a chirped pulse) in which chirps have occurred, the dispersion compensator according to the present embodiment performs optical correlation processing using computer-generated holograms (hereafter, referred to as holograms). At this time, by using space-time optical information processing in which time domain processing is realized with space domain processing, an introduced light is introduced into a spatial filter including plural types of holograms on each of which the amplitude/phase of a chirped pulse (hereafter, referred to as a sample light) to be used as a reference for dispersion-compensation is recorded.

Here, the space-time optical information processing is processing for information including an ultra high-speed signal, and is basically processing of simultaneously expanding a time of an ultrashort optical pulse and a profile of a spectrum onto a two-dimensional spatial plane by using spatial localization and broadband performance of the ultrashort optical pulse (and a light in a domain ranging from approximately several picoseconds to several femtoseconds).

FIG. 1 is a diagram showing the fundamental principle of the dispersion compensating method in the present embodiment. As shown in FIG. 1, amplitude/phase information of sample light w(t) is recorded as a hologram. Introduced light s(t) is introduced into the hologram, and emitted light e(t) generated by the introduction is measured. At this time, when there is a strong correlation between the introduced light s(t) and the sample light w(t), a light having an amplitude in which a single central peak (hereafter, referred to as a correlation peak) protrudes sharply compared to a periphery (hereafter, referred to as an autocorrelation light) is emitted as the emitted light e(t). On the other hand, when there is a weak correlation between the introduced light s(t) and the sample light w(t), a light having an amplitude in which a central peak forms a plateau shape compared to a periphery (hereafter, referred to as a cross-correlation light) is emitted as the emitted light e(t). Thus, the emitted light e(t) is indicated by the following equation.

$$e(t) = \int s(\omega, x) W(\omega, x) \exp(-j\omega t) dt = s(t) \bigstar w(t) \quad \text{[Equation 1]}$$

Here, $S(\omega, x)$ is a characteristic of the introduced light s(t), and is a phase distribution of the introduced light s(t) spatially expanded on a Fourier plane. $W(\omega, x)$ is a characteristic of the sample light w(t), and is a phase distribution of the sample light w(t) recorded in the hologram. In other words, whereas the emitted light e(t) corresponds to a result of correlation processing of an optical pulse in a time domain, the emitted light e(t) can be realized by matched filtering in a space domain. Thus, when the characteristic $S(\omega, x)$ of the introduced light s(t) matches with the characteristic $W(\omega, x)$ of the hologram, the emitted light e(t) is emitted as a correlation peak in which energy of the optical pulse has gathered.

When it is noted that an autocorrelation light in which amplitude intensity appears strongly in a narrow band is equivalent to a dispersion-compensated chirped pulse, a chirped pulse can be dispersion-compensated by performing optical correlation processing on a introduced light and a sample light. That is to say, an autocorrelation light emitted from a spatial filter is treated as a dispersion-compensated chirped pulse.

Next, the dispersion compensator in the present embodiment will be described.

Figure 2:
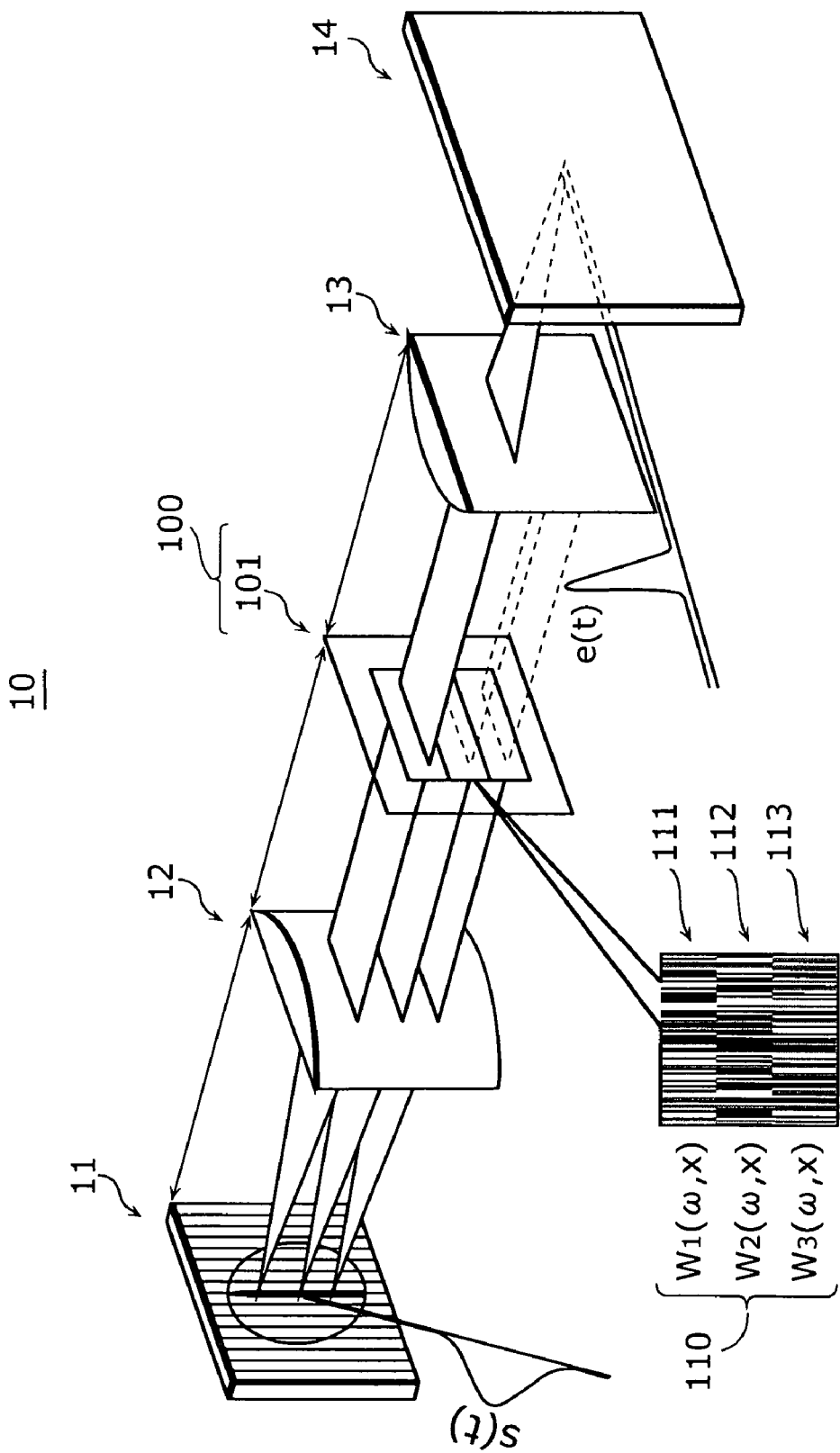
FIG. 2 is a diagram showing a dispersion compensator in the embodiment 1 according to the present invention.

FIG. 2 is a diagram showing the dispersion compensator in the present embodiment. As shown in FIG. 2, a dispersion compensator 10 includes a diffraction grating 11, a collimator lens 12, a focus lens 13, a diffraction grating 14, and a spatial filter 100. The diffraction grating 11 is an optical element for extracting a light having a specific wavelength from a light having mixed wavelengths. The collimator lens 12 is an optical element for transforming the light having the specific wavelength extracted by the diffraction grating 11 into a parallel light beam. The focus lens 13 is an optical element for focusing a light on which dispersion compensating processing has been performed by the spatial filter 100. The diffraction grating 14 is an optical element for restoring the light focused by the focus lens 13 to the light having the mixed wavelengths. The spatial filter 100 is positioned between the collimator lens 12 and the focus lens 13 so that the light transformed from the time domain into the space domain is introduced into each of holograms included in a hologram group 110 in parallel by obliquely introducing the light relative to a plane on which the diffraction grating 11 is formed.

The spatial filter 100 includes one optical filter. Here, as an example, the spatial filter 100 includes an optical filter 101 on which the hologram group 110 is formed. Further, as with the hologram group 110, a hologram in which a sample light is recorded is formed on the optical filter 101 for each of sample lights. Each of holograms in the hologram group 110 is separately calculated using a computer.

For instance, a hologram 111 (phase distribution $W_1(\omega, x)$) is a TL pulse hologram in which Fourier transform limit pulse (hereafter, referred to as a TL pulse) having 100 fs half-time, 800 nm central wavelength, and 10 nm half-wavelength is recorded as a sample light. A hologram 112 (phase distribution $W_2(\omega, x)$) is a chirped pulse (500 fs) hologram in which an optical pulse (hereafter, referred to as a chirped pulse (500 fs)) generated by giving 500 fs chirp quantity to a TL pulse is recorded as a sample light. A hologram 113 (phase distribution $W_3(\omega, x)$) is a chirped pulse (1 ps) hologram in which an optical pulse (hereafter, referred to as a chirped pulse (1 ps)) generated by giving 1 ps chirp quantity to a TL pulse is recorded as a sample light.

Moreover, the optical filter 101 is positioned between the collimator lens 12 and the focus lens 13 so that an introduced light transformed from the time domain into the space domain is introduced into each hologram in parallel. At this time, when there is a strong correlation between the introduced light and a sample light recorded in a hologram, an autocorrelation light is emitted. On the other hand, when there is a weak correlation between the introduced light and the sample light recorded in the hologram, a cross-correlation light is emitted.

Next, holograms formed on the spatial filter 100 in the present embodiment will be described.

When creating a hologram that corresponds to any optical pulse, a computer can be used to create the hologram, without performing recording using an actual optical pulse. Here, the hologram is created using the computer. To be more specific, a waveform of an emitted light is calculated from chirp quantity of an introduced light and hologram pattern information, in accordance with a principle of computer-generated hologram. Here, as an example, an optical pulse generated by giving linear chirp quantity to a TL pulse is an introduced light. When an introduced light having specific chirp quantity is introduced, a sharp correlation peak appears, whereas when an introduced light having chirp quantity in an adjacent range of the specific chirp quantity, hologram pattern information is calculated with a phase distribution of the hologram modulated under the condition that no sharp correlation peak appears. However, a problem presented by such a complex condition cannot be mathematically solved in a simple manner; thus, here, an optimization algorithm (simulated annealing) is used to calculate the pattern information of the hologram.

The optimization algorithm (simulated annealing) is one of optimization algorithms that use repeated computations performed by the computer, and is a means of finding an optimal solution to a plurality of problems (complex condition problems) that are targets for optimization. It is possible to obtain a true optimal solution without being bound to a logical solution; thus, the optimization algorithm can be applied to all problems regardless of the form of the target for optimization, and is used in different fields.

Specifically, in the optimization algorithm (simulated annealing), an evaluation function which evaluates a degree to which a problem has been optimized is used. This evaluation function is expressed as a function of parameters to be optimized, and is set so as to decrease in value with a higher degree of optimization. First, initial parameters to be optimized are determined at random. Perturbation is applied to these parameters at random. In the initial state, the size of the perturbation is large, causing the value of the evaluation function to change at random. The size of the perturbation is gradually reduced while repeatedly applying the random perturbation. As the perturbation decreases, it gradually becomes more difficult for the value of the evaluation function to break away from a minimum. By repeating the perturbation until it has become sufficiently small, a minimum value of the evaluation function is obtained, and the parameters at that time are the optimal solution to the problem.

In other words, with the optimization algorithm (simulated annealing), a random perturbation is repeatedly applied to the parameters of the problem to be optimized, and the size of the perturbation is gradually reduced while evaluating the degree of optimization of the target of optimization when the perturbation is applied. This is repeated while causing the parameters to be optimized to gradually converge, until the size of the perturbation becomes sufficiently small. Accordingly, it is possible to find a minimum value without being bound to the logical minimum, and possible to obtain the optimal solution of the parameters to be optimized.

In this manner, with the optimization algorithm (simulated annealing), it is possible to perform optimization processing simultaneously on plural optimization parameters. Moreover, the optimization algorithm (simulated annealing) is superior in comparison with other algorithms in that a true optimal solution to the evaluation function can be obtained without falling into a logical solution. Furthermore, the optimization algorithm (simulated annealing) can be changed in accordance with a goal of the evaluation function, and this is applicable to all problems regardless of the form of the optimization target.

Figure 3:
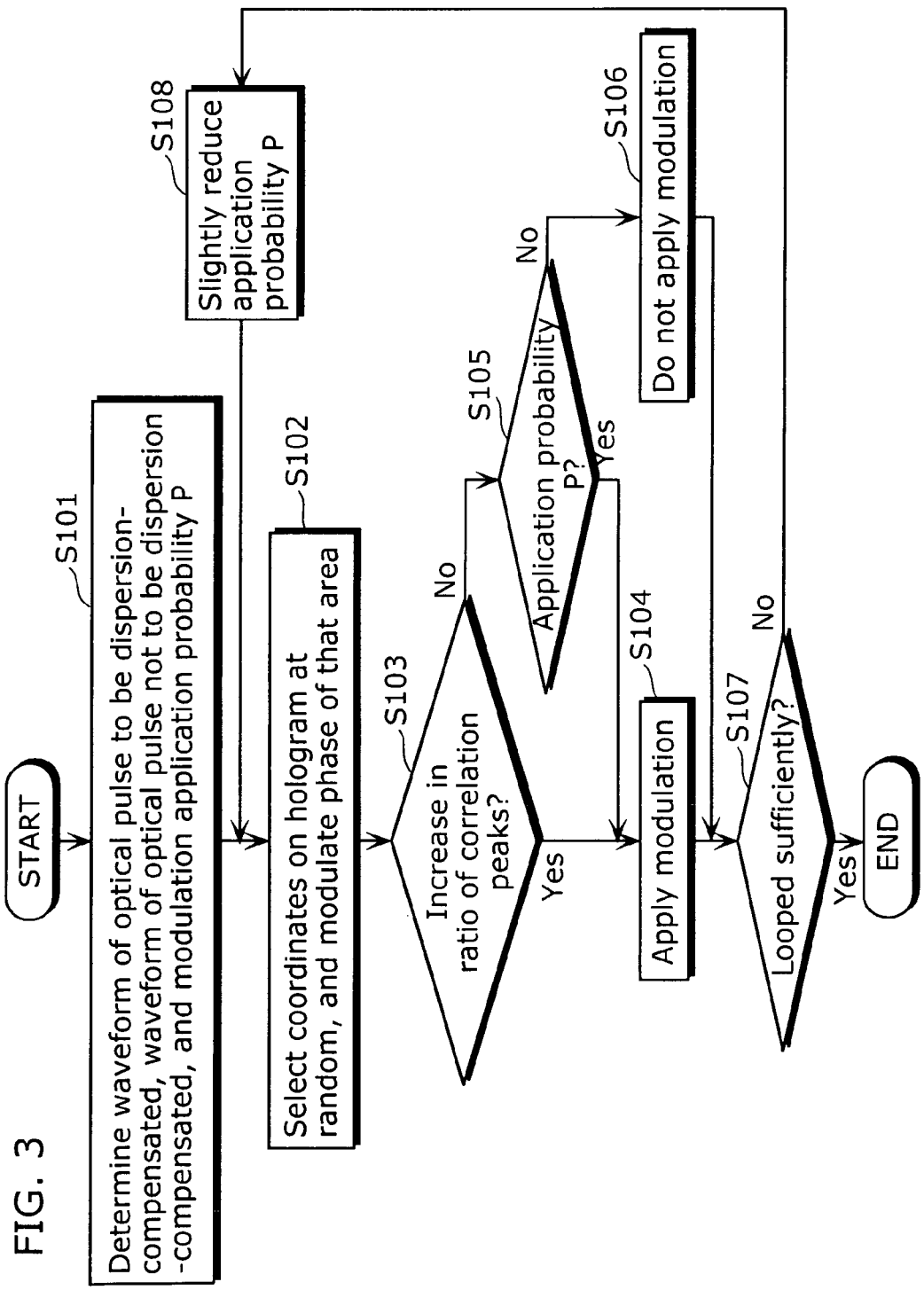
FIG. 3 is a flow chart showing an operation for calculating hologram pattern information in the embodiment 1 according to the present invention.

FIG. 3 is a flow chart showing an operation for calculating hologram pattern information in the present embodiment. As shown in FIG. 3, a phase distribution of a hologram is calculated through processing in the following steps S101 to S108.

First, a waveform of an optical pulse to be dispersion-compensated, a waveform of an optical pulse not to be dispersion-compensated, and a modulation application probability P for applying modulation to the phase distribution of a selected area on the hologram are determined as an initial value (S101).

Next, coordinates on the hologram are selected at random, and a phase distribution of the selected coordinates is modulated (S102).

Next, in the case where each of the optical pulse to be dispersion-compensated and the optical pulse not to be dispersion-compensated is introduced into the modulated hologram, a ratio of correlation peaks among each of emitted lights emitted from the modulated hologram is calculated. The calculated ratio of the correlation peaks is compared to a ratio of correlation peaks calculated before the modulation, and it is judged whether or not there has been an increase in the ratio (S103).

In the case where a result of the judgment shows the increase in the ratio of the correlation peaks (Yes in S103), the modulation of the phase distribution of the selected coordinates is applied (S104). On the other hand, in the case where no increase in the ratio of the correlation peaks is shown (No in S103), the modulation is applied (S104) or the modulation is not applied (S106) according to the application probability P (S105).

Until the operation has looped sufficiently (S107), the steps S102 to S106 are repeatedly performed (No in S107) while slightly reducing the application probability P (S108); in the case where an introduced light is the optical pulse to be dispersion-compensated, modulation is performed so that a sharp correlation peak appears; and in the case where the introduced light is the optical pulse not to be dispersion-compensated, the modulation is performed so that the sharp correlation peak does not appear, and the phase distribution of the hologram is modulated so that the ratio of a correlation peak to a crosstalk peak reaches a maximum. That is to say, the hologram pattern information is calculated so that the ratio of the correlation peak to the crosstalk peak reaches the maximum. Holograms are formed on the spatial filter 100 according to the hologram information calculated in the above manner.

It is to be noted that for convenience of calculation using the optimization algorithm (simulated annealing), holograms are not uniquely specified. For this reason, depending on an initial value or the number of loops set, it is possible to obtain a hologram which compensates a wide range of dispersion, a hologram which identifies optical pulses each having a high degree of similarity or the like.

Figure 4:
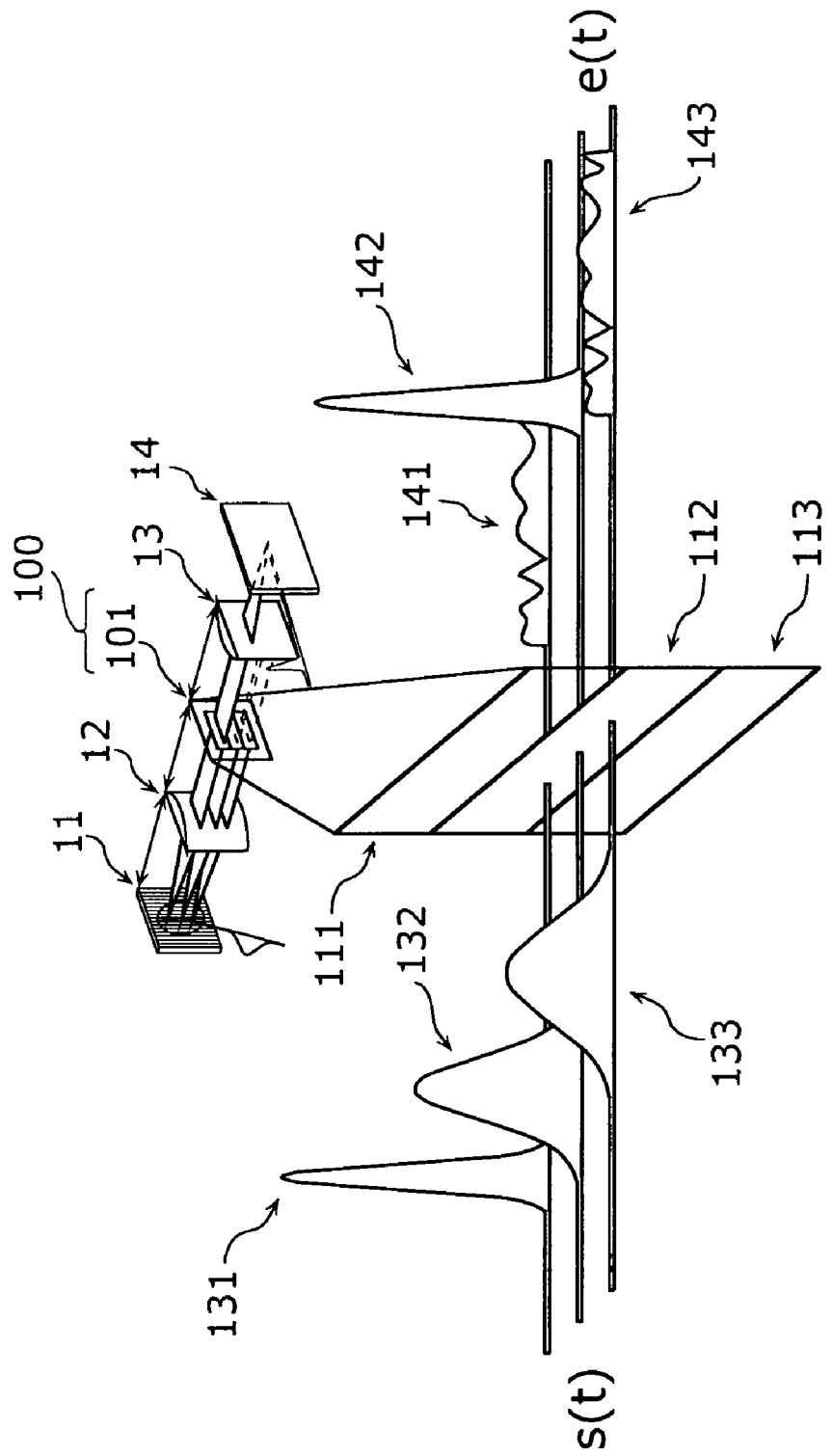
FIG. 4 is a diagram showing a relationship between an introduced light and an emitted light with respect to a hologram in the embodiment 1 according to the present invention.
Figure 5A:
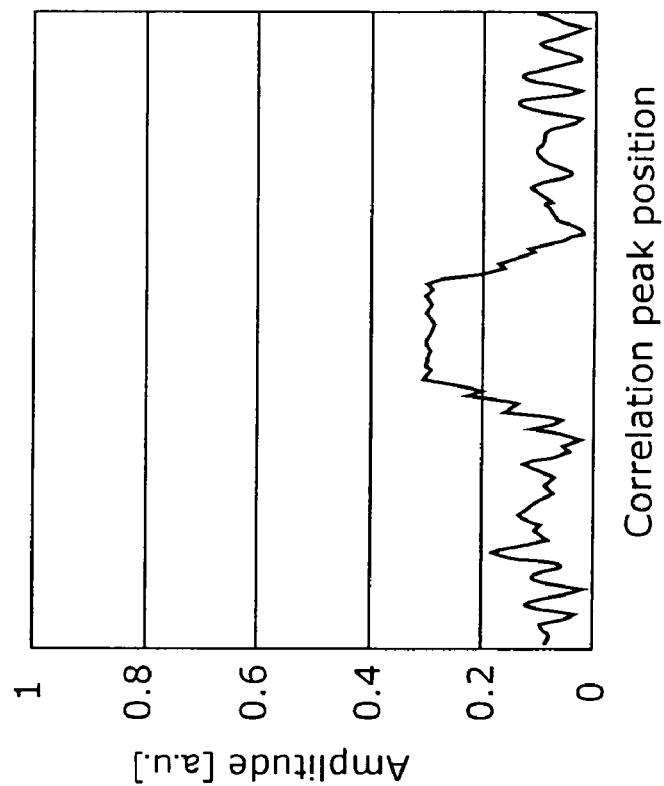
FIG. 5A is a diagram showing a result of a simulation of a case where a chirped pulse to be dispersion-compensated is introduced into a hologram in the embodiment 1 according to the present invention.
Figure 5B:
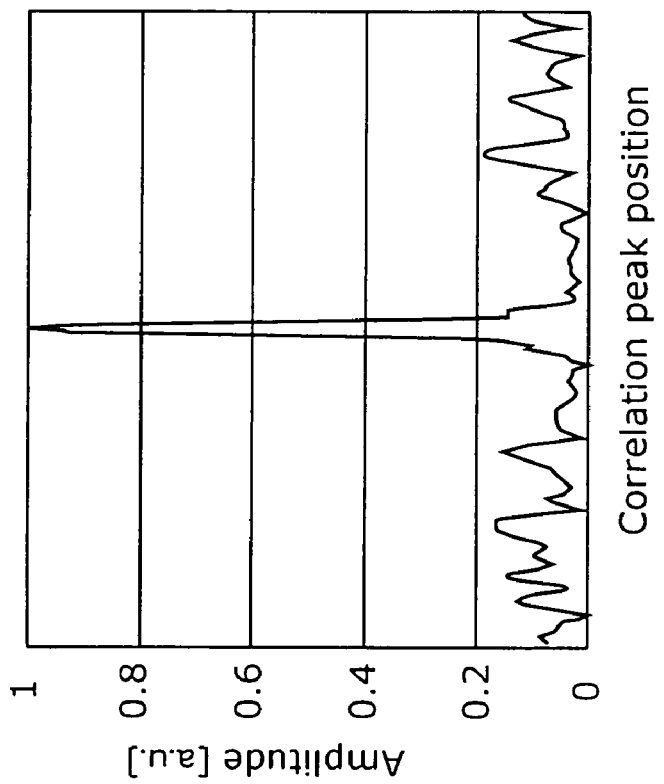
FIG. 5B is a diagram showing a result of a simulation of a case where a chirped pulse not to be dispersion-compensated is introduced.
Figure 6:
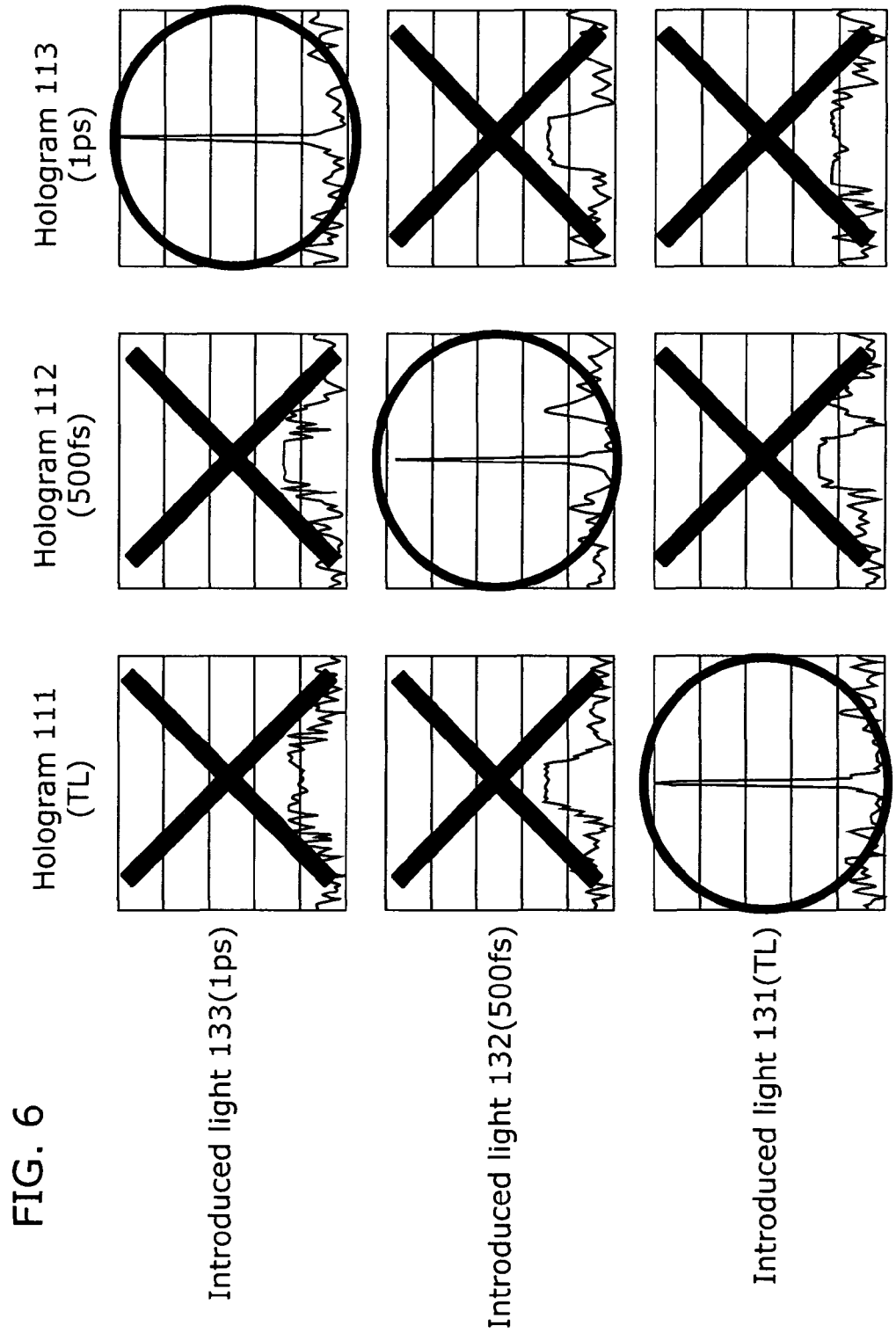
FIG. 6 is a diagram showing a result of a simulation of each of lights emitted from a corresponding one of holograms in the embodiment 1 according to the present invention.

FIG. 4 is a diagram showing a relationship between an introduced light and an emitted light with respect to a hologram in the present embodiment. FIG. 5A is a diagram showing a result of a simulation of an emitted light that is emitted after a chirped pulse to be dispersion-compensated is introduced into a hologram which compensates dispersion of a predetermined chirped pulse. FIG. 5B is a diagram showing a result of a simulation of an emitted light that is emitted after a chirped pulse not to be dispersion-compensated is introduced. FIG. 6 is a diagram showing a result of a simulation of each of lights emitted from a corresponding one of holograms.

Here, as an example, hologram pattern information for compensating dispersion of three types of optical pulses is prepared, and correlation peaks at the time of linearly varying chirp quantity of an introduced light are simulated. For instance, introduced light 131 is a TL pulse. Introduced light 132 is a chirped pulse (500 fs). Introduced light 133 is a chirped pulse (1 ps).

As shown in FIG. 4, when a chirped pulse to be dispersion-compensated, such as the introduced light 132, is introduced into hologram 112, because there is a strong correlation between the introduced light and a sample light, an autocorrelation light, such as emitted light 142, is emitted from the hologram 112 (e.g., refer to FIG. 5A). On the other hand, when a chirped pulse not to be dispersion-compensated, such as the introduced lights 131 and 133, is introduced into the hologram 112, because there is a weak correlation between the introduced light and the sample light, a cross-correlation light, such as emitted lights 141 and 143, is emitted from the hologram 112 (e.g., refer to FIG. 5B).

Based on this, as shown in FIG. 6, when the introduced light 131 is introduced into hologram 111, an autocorrelation light is emitted from the hologram 111. When the introduced light 132 or the introduced light 133 is introduced into the hologram 111, a cross-correlation light is emitted from the hologram 111. Furthermore, when the introduced light 132 is introduced into hologram 112, an autocorrelation light is emitted from the hologram 112. When the introduced light 131 or the introduced light 133 is introduced into the hologram 112, a cross-correlation light is emitted from the hologram 112. Moreover, when the introduced light 133 is introduced into hologram 113, an autocorrelation light is emitted from the hologram 113. When the introduced light 131 or the introduced light 132 is introduced into the hologram 113, a cross-correlation light is emitted from the hologram 113.

As stated above, a correlation peak appearing in amplitude of an emitted light emitted from a hologram appears as a higher peak in a narrower band with a stronger correlation between the introduced light and the sample light, and appears as a lower peak in a wider band with a weaker correlation between the introduced light and the sample light. Further, the correlation peak reaches the maximum height when chirp quantity of the introduced light is equal to that of the sample light, and a TL pulse is emitted as an autocorrelation light. When the chirp quantity of the introduced light is not equal to that of the sample light, a light scattered with a correlation peak lowered according to a difference between the chirp quantity of the introduced light and that of the sample light is emitted as a cross-correlation light. That is to say, a change in a waveform of the emitted light occurs depending on the chirp quantity.

Figure 7:
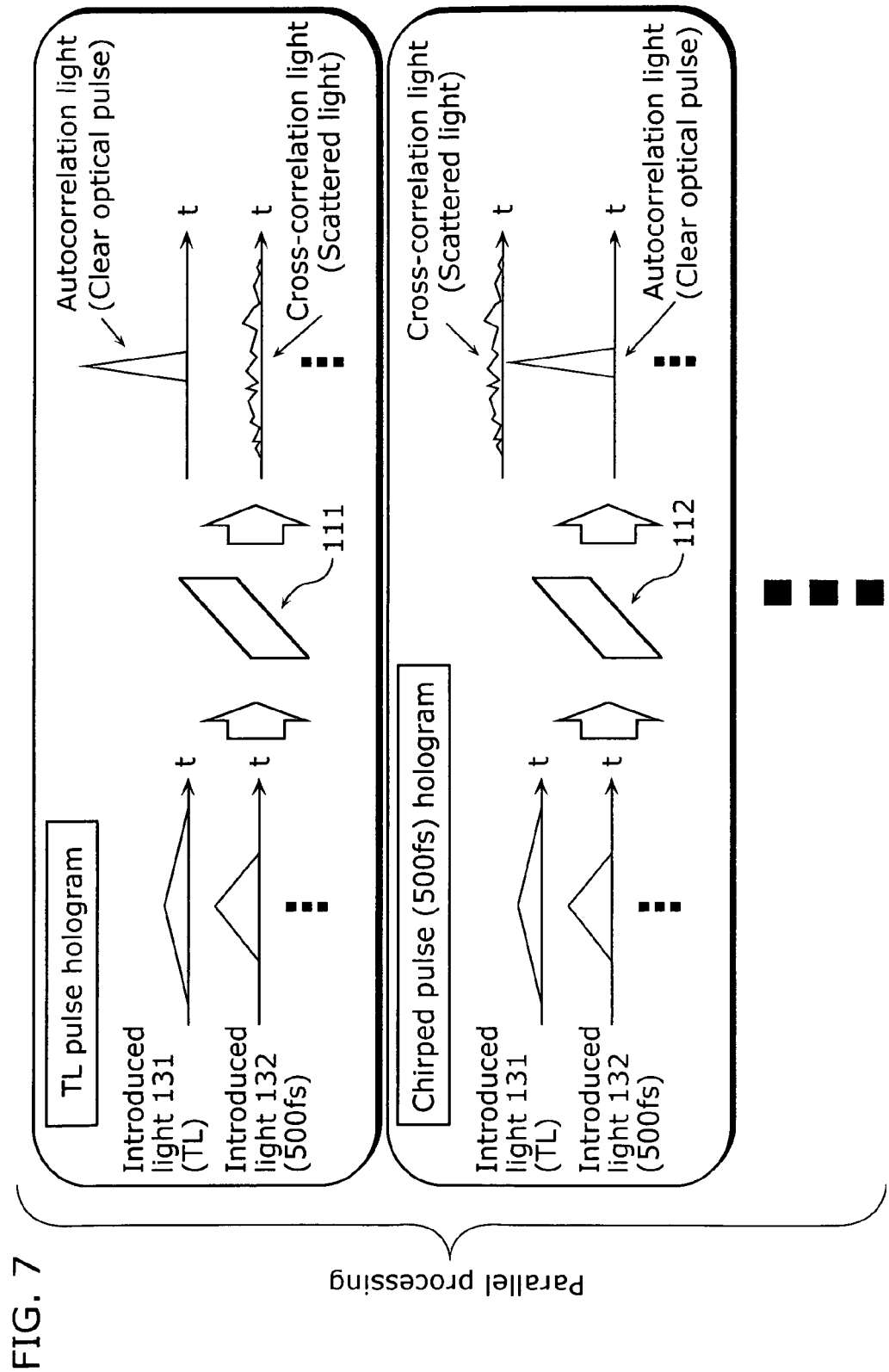
FIG. 7 is a diagram schematically showing parallel processing, in which a spatial filter is used, in the embodiment 1 according to the present invention.

FIG. 7 is a diagram schematically showing parallel processing, in which the spatial filter 100 is used, in the present embodiment. As shown in FIG. 7, when the introduced lights 131 and 132 are introduced into the holograms 111 and, 112 in parallel, respectively, a clear optical pulse obtained by compensating dispersion occurring in the introduced light 131 is emitted from the hologram 111, and a clear optical pulse obtained by compensating dispersion occurring in the introduced light 132 is emitted from the hologram 112.

As shown in FIG. 6, when the introduced light 131 is introduced into the hologram 111, an autocorrelation light (clear optical pulse) is emitted from the hologram 111. When the introduced light 132 is introduced into the hologram 111, a cross-correlation light (scattered light) is emitted from the hologram 111. In other words, even when the introduced lights 131 and 132 are simultaneously introduced into the hologram 111, the autocorrelation light to be emitted from the hologram 111 is resulted from the introduced light 131.

Likewise, when the introduced light 131 is introduced into the hologram 112, the cross-correlation light (scattered light) is emitted from the hologram 112. When the introduced light 132 is introduced into the hologram 112, the autocorrelation light (clear optical pulse) is emitted from the hologram 112. In other words, even when the introduced lights 131 and 132 are simultaneously introduced into the hologram 112, the autocorrelation light to be emitted from the hologram 112 is resulted from the introduced light 132.

As stated above, even when optical pulses are simultaneously introduced into a hologram, identifying an autocorrelation light and a cross-correlation light to be emitted from the hologram enables the optical pulses to be simultaneously introduced into the hologram. Further, introducing the optical pulses into a hologram group enables dispersion occurring in the optical pulses to be compensated with parallel processing. Holograms are arranged in array to be formed on the spatial filter 100. Optical pulses to be dispersion-compensated are introduced into the holograms, and dispersion compensating processing for optical pulse is performed through optical correlation processing on the optical pulses to be dispersion-compensated and a reference optical pulse.

Next, the optical filter 101 created by using an electronic etching device in accordance with the holograms calculated in the above manner will be described.

Figure 8A:
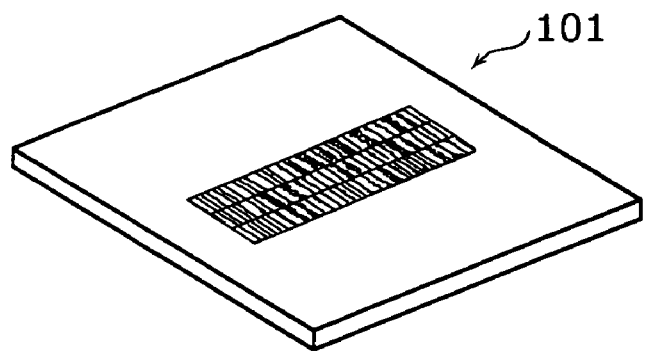
FIG. 8A is a perspective view showing an outline of an optical filter in the embodiment 1 according to the present invention.
Figure 8B:
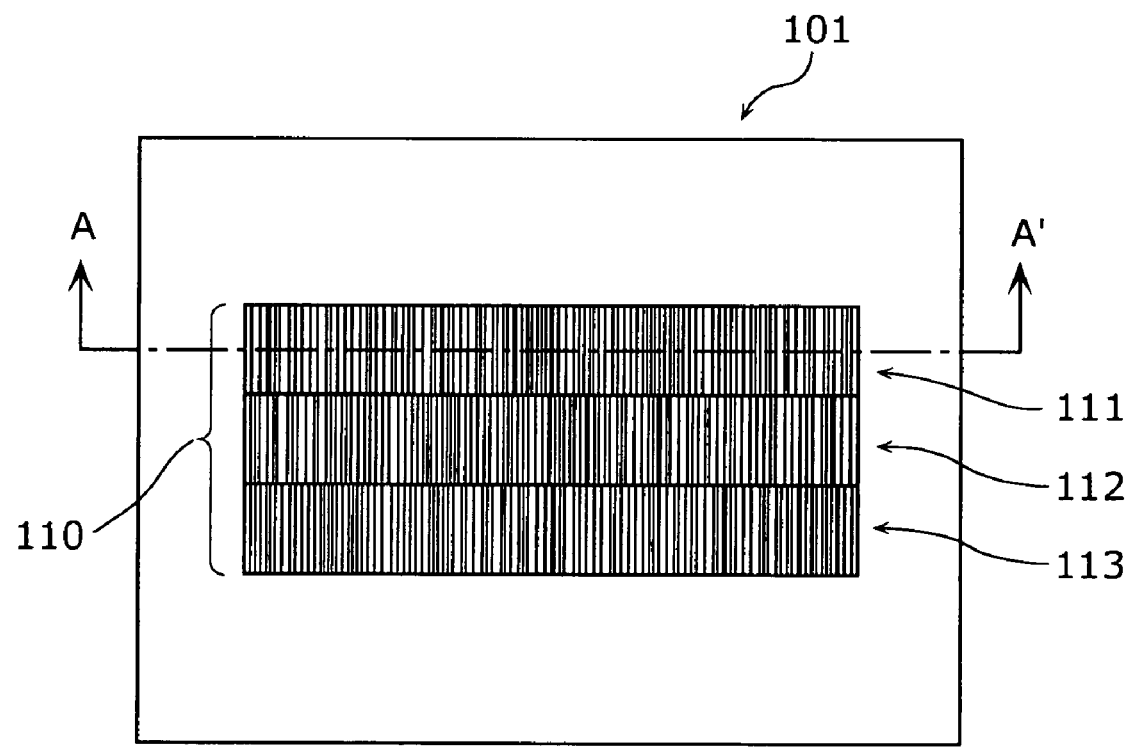
FIG. 8B is a plan view showing the outline of the optical filter in the embodiment 1 according to the present invention.
Figure 9A:
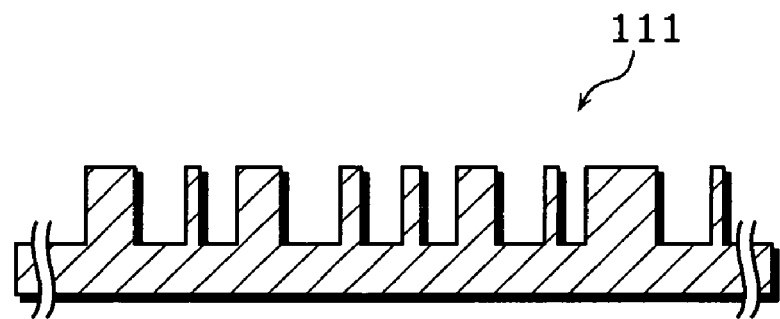
FIG. 9A is a diagram showing a section of the optical filter, cut along section line A-A' and viewed in an arrow direction, in the embodiment 1 according to the present invention.
Figure 9B:
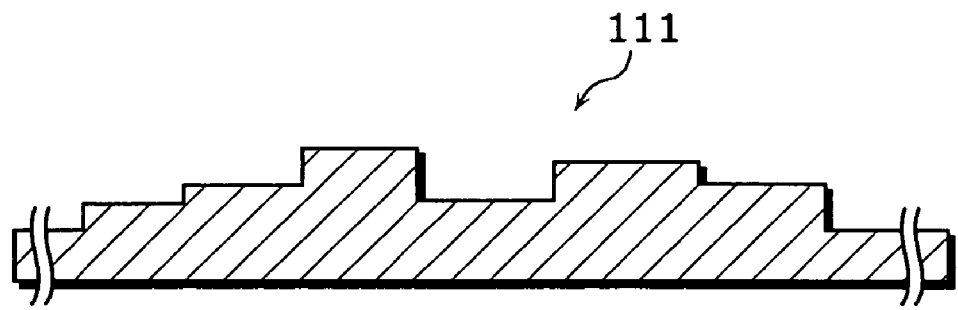
FIG. 9B is a diagram showing a section of the optical filter, cut along section line A-A' and viewed in an arrow direction, in a modification of the embodiment 1 according to the present invention.

FIG. 8A is a perspective view showing an outline of the optical filter 101 in the present embodiment. FIG. 8B is a plan view showing an outline of the optical filter 101 in the present embodiment. FIGS. 9A and 9B each are a diagram showing a section of the optical filter 101, cut along section line A-A' and viewed in an arrow direction, in the present embodiment.

As shown in FIGS. 8A and 8B, the optical filter 101 is a glass substrate with sides 1 inch in length on which each hologram is formed. The hologram has a height of 0.8 mm and a width of 7.5 mm, and is arranged in array in a short side direction of the hologram. Further, plural grooves having a depth of 0.88 µm and a width of 3.125 µm are formed on the hologram by using the electronic etching device, in accordance with pattern information of each hologram calculated by using the computer. A phase delay of an introduced light is adjusted depending on an area determined by the depth and width of the grooves, and binary phase modulation of 0 and π is performed on the introduced light.

It is to be noted that instead of being formed with a fixed depth, (e.g., refer to FIG. 9A), each hologram may be formed with a variable depth of plural steps (for instance, four steps) (e.g., refer to FIG. 9B). A width and height of a step is determined according to the hologram designed by using the computer. The phase delay of the introduced light is adjusted depending on an area determined by the width and height of the step, and the binary phase modulation of 0 and π is performed on the introduced light.

As described above, according to the dispersion compensator 10 in the present embodiment, the dispersion compensating processing for optical pulse is performed through the optical correlation processing for optical pulse using the holograms, instead of the inverse dispersion being performed on the optical pulses to be dispersion-compensated. Accordingly, the dispersion compensating processing can be performed with a pulse still in light form, without converting light to electricity; therefore, a drop in throughput can be suppressed. Further, by using the holograms arranged in array, it becomes possible to perform the dispersion compensating processing over ranges.

Embodiment 2

The following will describe an embodiment 2 according to the present invention with reference to the drawings.

A dispersion compensator in the present embodiment includes the following features (a) and (b).

(a) Each of holograms is structured by being overlapped with two or more types of phase distribution patterns.

(b) Each of the hologram includes: (b1) a first-stage phase distribution pattern from which a randomly scattered light is emitted as a first cross-correlation light when the light having the strong correlation with the optical pulse to be dispersion-compensated is introduced into the first-stage phase distribution pattern, and from which a light that is randomly scattered and has a weak correlation with the first cross-correlation light is emitted as a second cross-correlation light when the light having the weak correlation with the optical pulse to be dispersion-compensated is introduced into the first-stage phase distribution pattern; and (b2) a second-stage phase distribution pattern from which the autocorrelation light is emitted when the first cross-correlation light is introduced into the second-stage phase distribution pattern, and from which the cross-correlation light is emitted when the second cross-correlation light is introduced into the second-stage phase distribution pattern.

In light of the above features, the dispersion compensator in the present embodiment will be described with reference to the drawings. It is to be noted that the same elements as in the embodiment 1 are indicated by the same reference numerals, and the description of such elements is omitted.

Figure 10:
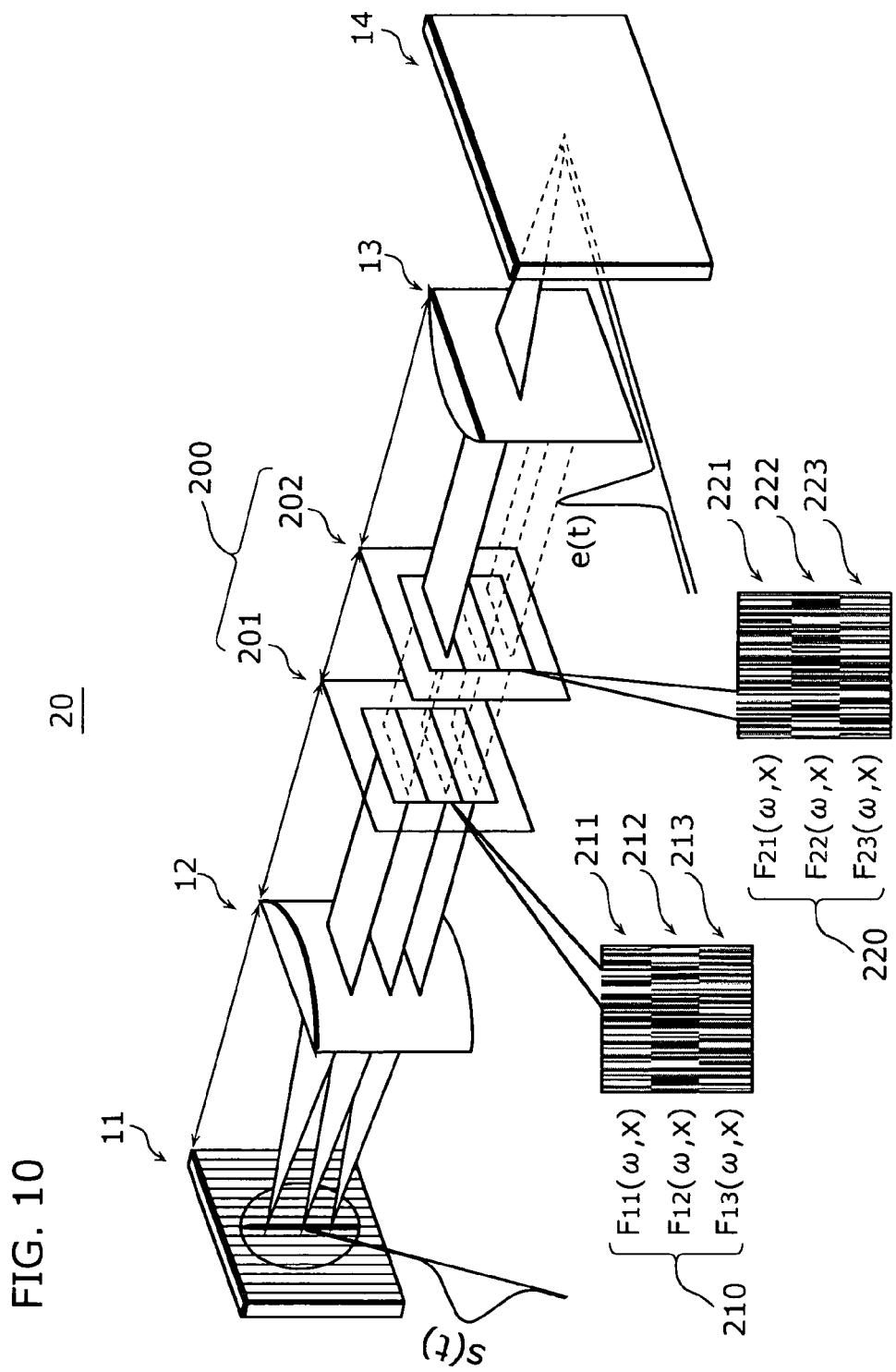
FIG. 10 is a diagram showing a dispersion compensator in an embodiment 2 according to the present invention.

FIG. 10 is a diagram showing a dispersion compensator in the present embodiment. As shown in FIG. 10, a dispersion compensator 20 differs from the dispersion compensator 10 in the embodiment 1 (e.g., refer to FIG. 1) in that a spatial filter 200 is included instead of the spatial filter 100.

The spatial filter 200 includes optical filters on each of which a phase distribution is formed. The spatial filter 200 functions in the same way as the spatial filter 100 in the embodiment 1, by being overlapped with the optical filters. It is to be noted that when forming the phase distribution on each optical filter, holograms are calculated by using the optimization algorithm (simulated annealing) described in the embodiment 1. The calculated holograms are developed by spatial frequencies, and a phase distribution of each spatial frequency obtained by the development is formed separately.

It is to be noted that as with the optical filter 101 in the embodiment 1, each optical filter is created by using the electronic etching device in accordance with the phase distribution of the spatial frequency.

Here, as an example, the spatial filter 200 includes an optical filter 201 on which a phase distribution pattern group 210 is formed and an optical filter 202 on which a phase distribution pattern group is formed. Further, each of phase distributions in the phase distribution pattern group 210 corresponds one-on-one to each of phase distributions in the phase distribution pattern group 220, and holograms are formed by being overlapped with the corresponding phase distributions. A sample light is set to each hologram.

Moreover, the spatial filter 200 is positioned between the collimator lens 12 and the focus lens 13 so that a light transformed from a time domain into a space domain is introduced into each hologram in parallel by obliquely introducing the light relative to a plane on which the diffraction grating 11 is formed. Here, the optical filter 201 is positioned at the side of the collimator lens 12 so that a light which is transformed into a parallel light beam by the collimator lens 12 is introduced into each hologram of the phase distribution pattern group 210 in parallel. The optical filter 202 is positioned at the side of the focus lens 13 so that a light emitted from each hologram of the phase distribution pattern group 210 is introduced into a corresponding one of holograms of the phase distribution pattern group 220.

For instance, the phase distribution pattern group 210 includes a phase distribution pattern 211, a phase distribution pattern 212, a phase distribution pattern 213, and the like. The phase distribution pattern group 220 includes a phase distribution pattern 221, a phase distribution pattern 222, a phase distribution pattern 223, and the like.

Hereafter, for the sake of simplicity, only the phase distribution patterns 211, 212, 221, and 222 will be described, and the description of the phase distribution patterns 213 and 223 will be omitted.

The phase distribution pattern 211 corresponds one-on-one to the phase distribution pattern 221, and a first hologram is formed by being overlapped with the phase distribution patterns 211 and 221. The phase distribution pattern 212 corresponds one-on-one to the phase distribution pattern 222, and a second hologram is formed by being overlapped with the phase distribution patterns 212 and 222. A first sample light is recorded in the first hologram. A second sample light is recorded in the second hologram.

Accordingly, when a light having a strong correlation with the first sample light is introduced as an introduced light into the phase distribution pattern 211, because there is the strong correlation between the introduced light and the sample light, an autocorrelation light is emitted from the phase distribution pattern 221. In addition, when a light having a strong correlation with the second sample light is introduced as an introduced light into the phase distribution pattern 211, because there is a weak correlation between the introduced light and the first sample light, a cross-correlation light is emitted from the phase distribution pattern 221.

Likewise, when a light having a strong correlation with the first sample light is introduced as an introduced light into the phase distribution pattern 212, because there is a weak correlation between the introduced light and the second sample light, a cross-correlation light is emitted from the phase distribution pattern 222. Furthermore, when a light having a strong correlation with the second sample light is introduced as an introduced light into the phase distribution pattern 212, because there is a strong correlation between the introduced light and the second sample light, an autocorrelation light is emitted from the phase distribution pattern 222.

In other words, even when a chirped pulse other than a chirped pulse to be dispersion-compensated is introduced into a hologram which functions by being overlapped with the phase distribution pattern groups 210 and 220, because a cross-correlation light is emitted, chirped pulses can be simultaneously introduced into the hologram. Further, simultaneously introducing the chirped pulses into holograms enables dispersion occurring in the chirped pulses to be compensated in parallel. That is to say, as with the spatial filter 100 in the embodiment 1, the spatial filter 200 can compensate in parallel the dispersion occurring in the chirped pulses.

Here, the phase distribution pattern 211 is a phase distribution pattern in which a light having a weak correlation with the first sample light, the second sample light, and a light to be recorded in the phase distribution pattern 212 is recorded. Further, when a light having a strong correlation with the first sample light is introduced, a first cross-correlation light is emitted, and when a light having a weak correlation with the first sample light is introduced, a second cross-correlation light is emitted.

Moreover, the phase distribution pattern 212 is a phase distribution pattern in which a light having a weak correlation with the first sample light, the second sample light, and a light to be recorded in the phase distribution pattern 211 is recorded. Further, when a light having a strong correlation with the second sample light is introduced, a third cross-correlation light is emitted, and when a light having a weak correlation with the second sample light is introduced, a fourth cross-correlation light is emitted.

Further, the phase distribution pattern 221 is a phase distribution pattern in which a light having a strong correlation with the first cross-correlation light and having a weak correlation with the second cross-correlation light is recorded. In addition, the phase distribution pattern 222 is a phase distribution pattern in which a light having a strong correlation with the third cross-correlation light and having a weak correlation with the fourth cross-correlation light is recorded.

It is to be noted that as a correlation between the light recorded in the phase distribution pattern 211 and the light recorded in the phase distribution pattern 212 is weak, a correlation between the first cross-correlation light and the third cross-correlation light is also weak.

When the light having the strong correlation with the first sample light is introduced into the phase distribution pattern 211, the first cross-correlation light is emitted from the phase distribution pattern 211 and then is introduced into the phase distribution pattern 221, and finally the autocorrelation light is emitted from the phase distribution pattern 221. On the other hand, when the light having the weak correlation with the first sample light is introduced into the phase distribution pattern 211, the second cross-correlation light is emitted from the phase distribution pattern 211 and then is introduced into the phase distribution pattern 221, and finally the cross-correlation light is emitted from the phase distribution pattern 221.

Furthermore, when the light having the strong correlation with the second sample light is introduced into the phase distribution pattern 212, the third cross-correlation light is emitted from the phase distribution pattern 212 and then is introduced into the phase distribution pattern 222, and finally the autocorrelation light is emitted from the phase distribution pattern 222. On the other hand, when the light having the weak correlation with the second sample light is introduced into the phase distribution pattern 212, the fourth cross-correlation light is emitted from the phase distribution pattern 212 and then is introduced into the phase distribution pattern 222, and finally the cross-correlation light is emitted from the phase distribution pattern 222.

Figure 11:
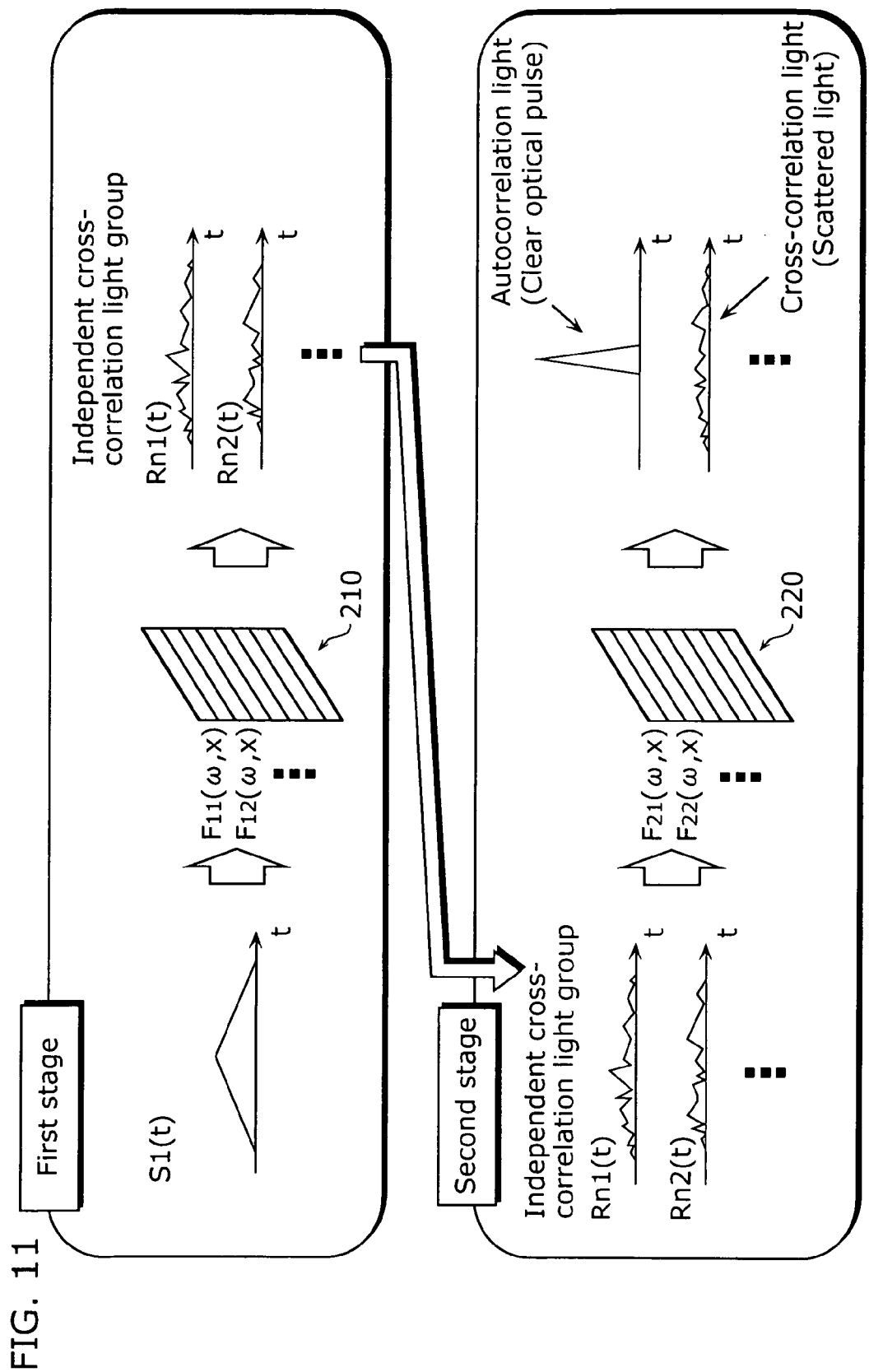
FIG. 11 is a diagram schematically showing parallel processing, in which a spatial filter is used, in the embodiment 2 according to the present invention.

FIG. 11 is a diagram schematically showing parallel processing, in which the spatial filter 200 is used, in the present embodiment. As shown in FIG. 11, specifically, an introduced light (chirped pulse s1($t$)) having a strong correlation with the first sample light is introduced into the phase distribution pattern 211 (phase distribution $F_{11}(\omega, x)$), the phase distribution pattern 211 (phase distribution $F_{12}(\omega, x)$), and the like in parallel. Along with this, a first cross-correlation light (random light Rn1($t$)) is emitted from the phase distribution pattern 211 (the phase distribution $F_{11}(\omega, x)$). In addition, a second cross-correlation light (random light Rn2($t$)) is emitted from the phase distribution pattern 212 (the phase distribution $F_{12}(\omega, x)$). It is to be noted that the first cross-correlation light (the random light Rn1($t$)) and the second cross-correlation light (the random light Rn2($t$)) are independent of one another.

Further, the first cross-correlation light (the random light Rn1($t$)) is introduced into the phase distribution pattern 221 (phase distribution $F_{21}(\omega, x)$). In addition, the second cross-correlation light (the random light Rn2($t$)) is introduced into the phase distribution pattern 222 (phase distribution $F_{22}(\omega, x)$). Along with this, because a correlation between the first cross-correlation light (the random light Rn1($t$)) and a light recorded in the phase distribution pattern 221 (the phase distribution $F_{21}(\omega, x)$) is strong, an autocorrelation light (clear optical pulse) is emitted from the phase distribution pattern 221 (the phase distribution $F_{21}(\omega, x)$). In addition, because a correlation between the second cross-correlation light (the random light Rn2($t$)) and a light recorded in the phase distribution pattern 222 (the phase distribution $F_{22}(\omega, x)$) is weak, a cross-correlation light (scattered light) is emitted from the phase distribution pattern 222 (the phase distribution $F_{22}(\omega, x)$).

As described above, according to the dispersion compensator 20 in the present embodiment, even when lights having a high degree of similarity are introduced into the phase distribution pattern group 210, because after each light is converted into an independent cross-correlation light (random light) once correlation processing is performed on the cross-correlation lights (the random lights) obtained by the conversion, it is possible to improve discrimination and prevent interference. In addition, because it is only necessary to design the independent cross-correlation lights (the random lights) to be emitted, reducing constraints on each hologram expands design freedom.

Moreover, when the second cross-correlation light (the random light Rn2($t$)) emitted from the phase distribution pattern 212 (the phase distribution $F_{12}(\omega, x)$) is introduced into the phase distribution pattern 222 (the phase distribution $F_{22}(\omega, x)$), because the scattered light is further scattered, a light (uninfluential light) scattered more than the second cross-correlation light (the random light Rn2($t$)) emitted from the phase distribution pattern 212 (the phase distribution $F_{12}(\omega, x)$) is emitted from the phase distribution pattern 222 (the phase distribution $F_{22}(\omega, x)$). As a result, because a light having relatively low influence is emitted, it is possible to improve the discrimination.

It is to be noted that the phase distribution pattern groups 210 and 220 may be formed on two optical filters separately or formed on an optical filter collectively. However, in comparison with forming the phase distribution pattern groups 210 and 220 on the optical filter collectively, it is easier to form the phase distribution pattern groups 210 and 220 on the two optical filters separately.

(Other)

It is to be noted that the present invention can be used as a light source stabilizer which stabilizes optical pulses provided from a light source, in addition to as the dispersion compensator which compensates dispersion occurring in an optical pulse.

Figure 12:
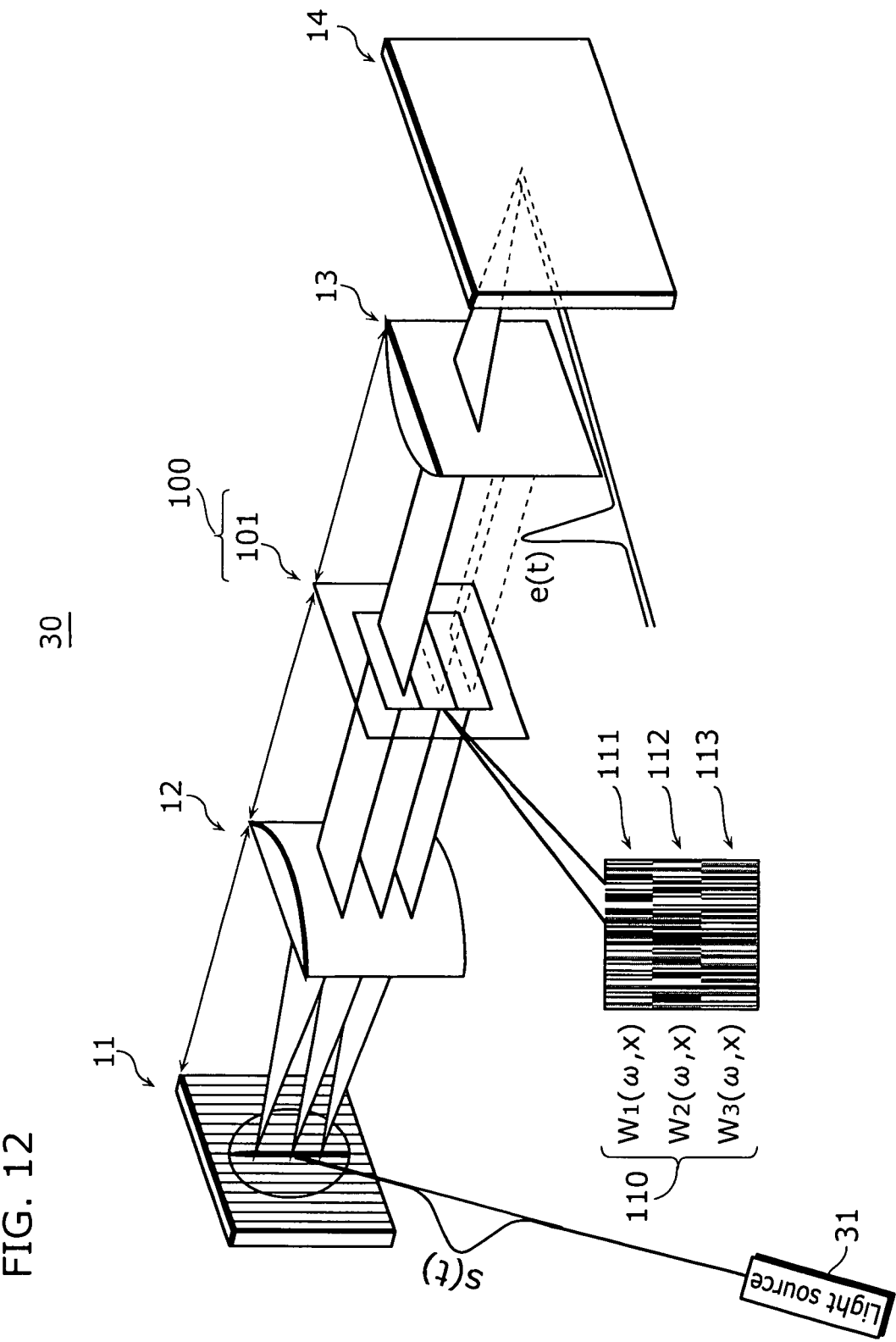
FIG. 12 is a diagram showing an example where a dispersion compensator according to the present invention is applied to a light source stabilizer.

FIG. 12 is a diagram showing an example where the dispersion compensator according to the present invention is applied to the light source stabilizer. As shown in FIG. 12, depending on a status of a light source, dispersion occurs in a waveform of an optical pulse provided from the light source. On the other hand, inclusion of the spatial filter 100 according to the present invention in a light source stabilizer 30 enables optical pulses emitted from a light source 31 to be supplied stably. To be more specific, the light source stabilizer 30 includes an optical filter which is similar to the optical filter 101 and on which holograms that compensate dispersion occurring in the optical pulses provided from the light source 31 are formed. The optical pulses provided from the light source 31 are stabilized by introducing the optical pulses into the optical filter. It is to be noted that the spatial filter 200 in the embodiment 2 may be used instead of the spatial filter 100.

It is to be noted that the dispersion compensator according to the present invention may be, for instance, applied to an optical communication device, such as an optical router, which relays optical packets inputted through communication channels.

An "optical packet" is, for example, a packet including headers and payloads in which optical pulses are arranged along a temporal axis such as a picosecond, a femtosecond, and an attosecond.

Figure 13:
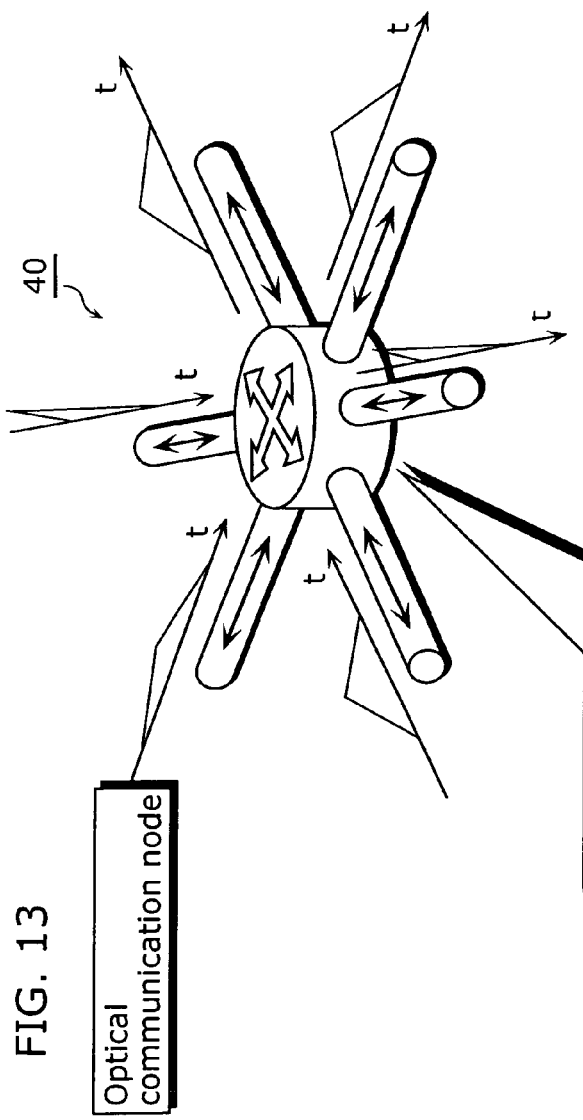
FIG. 13 is a diagram showing an example where the dispersion compensator according to the present invention is applied to an optical communication node.

FIG. 13 is a diagram showing an example where the dispersion compensator according to the present invention is applied to an optical communication node. As shown in FIG. 13, an optical communication node 40 compensates dispersion occurring in ad hoc light packets (chirped pulses) inputted through communication channels, using the spatial filter 100, and outputs dispersion-compensated light packets (clear optical pulses) to forwarding destinations.

It is to be noted that, assuming that a fiber amplifier is to be connected to a subsequent stage of the spatial filter 100, holograms may be calculated in consideration of inverse dispersion cancelling dispersion occurring in the fiber amplifier. In addition, according to an optical communication device to be connected to the subsequent stage instead of the fiber amplifier, the holograms may be calculated in consideration of the inverse dispersion cancelling dispersion occurring in the optical communication device.

With this, it is possible to compensate dispersion caused by passing through the fiber amplifier, the optical communication device, and the like. It is possible to output the dispersion-compensated optical pulses from the fiber amplifier, the optical communication device, and the like.

It is to be noted that the spatial filter 200 in the embodiment 2 may be used instead of the spatial filter 100.

INDUSTRIAL APPLICABILITY

The present invention can be used as a dispersion compensator which compensates dispersion occurring in an optical pulse and especially as a dispersion compensator which performs dispersion compensating processing for optical pulse using correlation processing for optical pulse.

The invention claimed is:

1. A dispersion compensator that compensates dispersion occurring in an optical pulse, said dispersion compensator comprising:
   a first diffraction grating that extracts a light having a specific wavelength from a light having mixed wavelengths;
   a collimator lens that converts the light having the specific wavelength extracted by said first diffraction grating into a parallel light beam;
   a spatial filter from which a pulsed light having a single peak is emitted as an autocorrelation light for a light having a strong correlation with an optical pulse to be dispersion-compensated, and from which a scattered light is emitted as a cross-correlation light for a light having a weak correlation with an optical pulse to be dispersion-compensated, the light having the strong correlation and the light having the weak correlation being included in the lights passing through said collimator lens;
   a focus lens that focuses the light on which dispersion compensating processing has been performed in said spatial filter; and
   a second diffraction grating that restores the light focused by said focus lens to the light having the mixed wavelengths,
   wherein said dispersion compensator compensates dispersion occurring in the optical pulse having the strong correlation with the optical pulse to be dispersion-compensated, with the autocorrelation light treated as a dispersion-compensated optical pulse.

2. The dispersion compensator according to claim 1, wherein said spatial filter includes holograms in each of which an amplitude and a phase of the optical pulse to be dispersion-compensated is recorded, from each of which the autocorrelation light is emitted when the light having the strong correlation with the optical pulse to be dispersion-compensated is introduced into a corresponding one of the holograms, and from each of which the cross-correlation light is emitted when the light having the weak correlation with the optical pulse to be dispersion-compensated is introduced into a corresponding one of the holograms.

3. The dispersion compensator according to claim 2, wherein said spatial filter includes the holograms each of which corresponds to a corresponding one of the optical pulses to be dispersion-compensated, and each hologram is rectangular in shape and is arranged in array in a short side direction of the hologram.

4. The dispersion compensator according to claim 2, wherein each of the holograms has a computer-generated pattern calculated using an optimization algorithm, under a condition that a ratio of a correlation peak of an emitted light emitted from the hologram into which the light having the strong correlation with the optical pulse to be dispersion-compensated is introduced to a correlation peak of an emitted light emitted from the hologram into which the light having the weak correlation with the optical pulse to be dispersion-compensated is introduced increases.

5. The dispersion compensator according to claim 2, wherein each of the holograms is structured by being overlapped with two or more types of phase distribution patterns.

6. The dispersion compensator according to claim 5, wherein each of the hologram includes:
   a first-stage phase distribution pattern from which a randomly scattered light is emitted as a first cross-correlation light when the light having the strong correlation with the optical pulse to be dispersion-compensated is introduced into the first-stage phase distribution pattern, and from which a light that is randomly scattered and has a weak correlation with the first cross-correlation light is emitted as a second cross-correlation light when the light having the weak correlation with the optical pulse to be dispersion-compensated is introduced into the first-stage phase distribution pattern; and
   a second-stage phase distribution pattern from which the autocorrelation light is emitted when the first cross-correlation light is introduced into the second-stage phase distribution pattern, and from which the cross-correlation light is emitted when the second cross-correlation light is introduced into the second-stage phase distribution pattern.

7. The dispersion compensator according to claim 1, wherein said spatial filter includes holograms each of which has a pattern calculated in consideration of inverse dispersion that cancels dispersion occurring in an optical device connected to a subsequent stage of said dispersion compensator.

8. A light source stabilizer comprising
the dispersion compensator according to claim 1,
wherein said light source stabilizer compensates dispersion occurring in an optical pulse emitted from a light source using the dispersion compensator, and emits the autocorrelation light as a dispersion-compensated optical pulse.

9. The light source stabilizer according to claim 8,
wherein said spatial filter includes holograms each of which is calculated in consideration of inverse dispersion that cancels dispersion occurring in an optical device connected to a subsequent stage of said light source stabilizer.

10. An optical communication device comprising
the dispersion compensator according to claim 1,
wherein said optical communication device compensates dispersion occurring in an ad hoc optical pulse inputted through communication channels using the dispersion compensator, and outputs the autocorrelation light as a dispersion-compensated optical pulse to a forwarding destination.

11. The optical communication device according to claim 10,
wherein said spatial filter includes holograms each of which is calculated in consideration of inverse dispersion that cancels dispersion occurring in an optical device connected to a subsequent stage of said optical communication device.

12. A dispersion compensation method for compensating dispersion occurring in an optical pulse, said dispersion compensation method comprising:

- extracting, with a first diffraction grating, a light having a specific wavelength from a light having mixed wavelengths;
- converting, with a collimator lens, the light having the specific wavelength extracted with the first diffraction grating into a parallel light beam;
- emitting, from a spatial filter, a pulsed light having a single peak as an autocorrelation light for a light having a strong correlation with an optical pulse to be dispersion-compensated,
- and emitting, from the spatial filter, a scattered light as a cross-correlation light for a light having a weak correlation with an optical pulse to be dispersion-compensated, the light having the strong correlation and the light having the weak correlation being included in the lights passing through the collimator lens;
- focusing, with a focus lens, the light on which dispersion compensating processing is performed with the spatial filter; and
- restoring, with a second diffraction grating, the light focused in said focusing with the focus lens to the light having the mixed wavelengths,
- wherein dispersion occurring in the optical pulse having the strong correlation with the optical pulse to be dispersion-compensated is compensated with said dispersion compensating method, with the autocorrelation light emitted from the spatial filter treated as a dispersion-compensated optical pulse.

* * * * *